United States Patent
Ju et al.

(10) Patent No.: US 8,313,239 B2
(45) Date of Patent: Nov. 20, 2012

(54) ADJUSTABLE PRELOAD TYPE LINEAR GUIDE SYSTEM

(75) Inventors: Min Jin Ju, Incheon (KR); Young Cheol Oh, Gyeongbuk (KR); Yong Sik Jeon, Gyeongbuk (KR); Su Jung Cho, Gyeongbuk (KR)

(73) Assignee: Famco Co., Ltd., Gyeongbuk (KR)

( * ) Notice: Subject to any disclaimer, the term of this patent is extended or adjusted under 35 U.S.C. 154(b) by 0 days.

(21) Appl. No.: 13/302,126

(22) Filed: Nov. 22, 2011

(65) Prior Publication Data
US 2012/0128277 A1   May 24, 2012

Related U.S. Application Data

(63) Continuation of application No. PCT/KR2009/002841, filed on May 28, 2009.

(51) Int. Cl.
*F16C 29/06* (2006.01)
(52) U.S. Cl. .......................... 384/45; 384/57
(58) Field of Classification Search ............ 384/43, 384/45, 49, 55, 57, 516
See application file for complete search history.

(56) References Cited

U.S. PATENT DOCUMENTS

| | | | |
|---|---|---|---|
| 5,388,913 A * | 2/1995 | Cawley et al. | 384/38 |
| 5,484,210 A * | 1/1996 | Gallone | 384/49 |
| 5,607,238 A * | 3/1997 | Sherman | 384/49 |
| 5,615,955 A * | 4/1997 | Namimatsu et al. | 384/13 |
| 5,755,515 A * | 5/1998 | Senjo et al. | 384/45 |
| RE36,005 E * | 12/1998 | Herbeck | 384/49 |
| 2002/0144561 A1* | 10/2002 | Nagai et al. | 74/89.33 |
| 2008/0253703 A1* | 10/2008 | Michioka et al. | 384/49 |

FOREIGN PATENT DOCUMENTS

| | | |
|---|---|---|
| JP | 05-253775 A | 10/1993 |
| JP | 09-264322 A | 10/1997 |
| JP | 2004-204901 A | 7/2004 |
| KR | 10-0380194 B1 | 4/2003 |
| KR | 10-0706843 B1 | 4/2007 |
| KR | 10-0901162 B1 | 5/2009 |

* cited by examiner

*Primary Examiner* — Thomas R Hannon
(74) *Attorney, Agent, or Firm* — Ladas & Parry LLP

(57) ABSTRACT

A linear guide system which is used for highly precise control of a linear position applicable in display devices, semiconductors, robots, machine tools, and the entire measurement and precision instruments industry, and more specifically, an adjustable preload type linear guide system, wherein a base member and a slide member are slidably connected with each other for linear motion, and a linear motion actuator, such as a ball screw, a hydraulic cylinder, and a linear motor, is disposed between the base member and the slide member, thereby enabling the slide member to move linearly relative to the base member.

8 Claims, 12 Drawing Sheets

ADJUSTABLE PRELOAD TYPE LINEAR GUIDE SYSTEM

TECHNICAL FIELD

The present invention relates to a linear guide system which is used for highly precise control of a linear position applicable in display devices, semiconductors, robots, machine tools, and the entire measurement and precision instruments industry, and more particularly, to an adjustable preload type linear guide system, wherein a base member and a slide member are slidably connected with each other for linear motion, and a linear motion actuator, such as a ball screw, a hydraulic cylinder, and a linear motor, is disposed between the base member and the slide member, thereby enabling the slide member to move linearly relative to the base member.

BACKGROUND ART

Linear motion actuators are generally used for highly precise control of a linear position applicable in display devices, semiconductors, robots, machine tools, and the entire precision instruments industry, and a linear motion mechanism including a linear motion guide, for example, may be used as a linear guide unit that guides linear position control of the linear motion actuator.

When linear motion mechanism systems are configured using the linear motion mechanism, as the weight of the linear motion guide and the weight of a support plate increase, cost for manufacturing the linear motion mechanism system increases, and the speed of the linear motion mechanism system is limited due to an increase in the size (volume) of the linear motion mechanism system.

Such linear motion mechanism systems using the linear motion mechanism are designed and manufactured according to their applied fields and thus are not compatible with other systems, and manufacturing cost thereof increases.

In addition, since the weight of the linear motion mechanism systems is heavy, there is a limitation in applying the linear motion mechanism systems to equipment, and their usage is restrictive.

In these days, linear guide units are disclosed as linear motion mechanisms with better efficiency, the linear guide units including a base member having a function of a prop, a slide member that is slidably installed at the base member, and an actuator that moves the slide member relative to the base member.

A guide portion for guiding slide motion is disposed on both the base member and the slide member, and a linear motion block is installed at the guide portion. The linear motion block includes a ball bearing including a plurality of steel balls that are moved on a caterpillar and embedded in the ball bearing so as to smoothly guide linear motion by minimizing friction that may occur when guiding slide motion.

Such general linear guide units have the following problems.

First, a preload applied to a ball bearing installed at the guide portion disposed on the base member and the slide member cannot be adjusted. That is, the steel balls of the ball bearing are combined with the ball bearing in such a way that the steel balls having the sizes selected according to levels of preloads when the steel balls are initially combined with the ball bearing are inserted in the ball bearing, and the preload of the ball bearing is varied as the ball bearing is worn out when it is being used, and thus the preload of the ball bearing cannot be adjusted. Since, in this way, the preload of the ball bearing cannot be adjusted when the ball bearing is being used, the degree of operation precision that may be lowered when the ball bearing is being used cannot be corrected. Thus, vibration and noise occur, and the life span of the linear guide units is reduced.

Second, the base member and the slide member are formed of heavy metals with high rigidity and high abrasion resistance so as to ensure abrasion resistance so that the range of application of the linear guide units is limited.

Third, steel balls having the same diameter are used in the ball bearing, as illustrated in FIG. 14. Friction between the steel balls occurs when the ball bearing is activated, resulting in accelerating abrasion and occurring noise and vibration.

DETAILED DESCRIPTION OF THE INVENTION

Technical Problem

The present invention provides an adjustable preload type linear guide system that may adjust a preload applied to a ball bearing so that abrasion of the ball bearing is reduced, occurrence of noise and vibration is prevented and highly precise linear motion is guided.

The present invention also provides an adjustable preload type linear guide system, of which a life span is remarkably increased by preventing abrasion of a ball bearing.

Technical Solution

According to an aspect of the present invention, an adjustable preload type linear guide system includes: a base member having a base body, and a pair of base rails which are disposed in parallel to each other on the base body; a slide member having a slide body, and a pair of slide rails which are disposed on the slide body to face the pair of base rails, wherein the slide rails slide relative to the base rails by a ball bearing which is installed between the base rails and the slide rails, thereby enabling the slide member to slide relative to the base member; and a preload adjustment unit which is installed between one of the slide rails and the slide body for adjusting the intervals and angles of the slide rails with respect to the slide body, thereby adjusting the preload of the ball bearing which is disposed between the base rails and the slide rails.

Advantageous Effects

In an adjustable preload type linear guide system according to the present invention, a preload of a ball bearing may be adjusted when the ball bearing is being used so that unnecessary abrasion of the ball bearing may be prevented.

In addition, occurrence of noise and vibration that may occur due to an improper preload of the ball bearing may be prevented so that the adjustable preload type linear guide system that guides linear motion with high precision may be provided.

By preventing unnecessary abrasion of the ball bearing, the present invention provides an adjustable preload type linear guide system, of which a life span is remarkably lengthened.

BEST MODE

Figure 1:
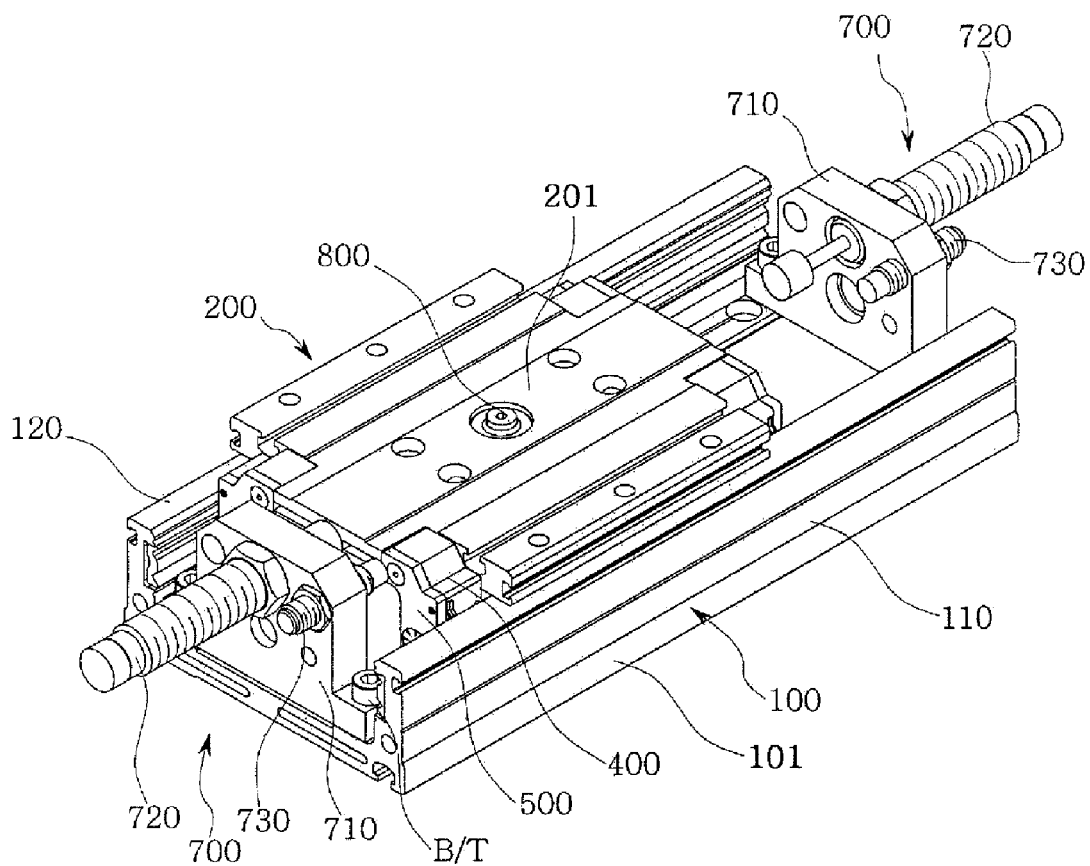
FIG. 1 is a perspective view of an adjustable preload type linear guide system according to an embodiment of the present invention.

The present invention will now be described more fully with reference to the accompanying drawings, in which exemplary embodiments of the invention are shown. FIG. 1 is a perspective view of an adjustable preload type linear guide system According to an embodiment of the present invention, and FIG. 2 is an exploded perspective view of the adjustable preload type linear guide system illustrated in FIG. 1.

Figure 2:
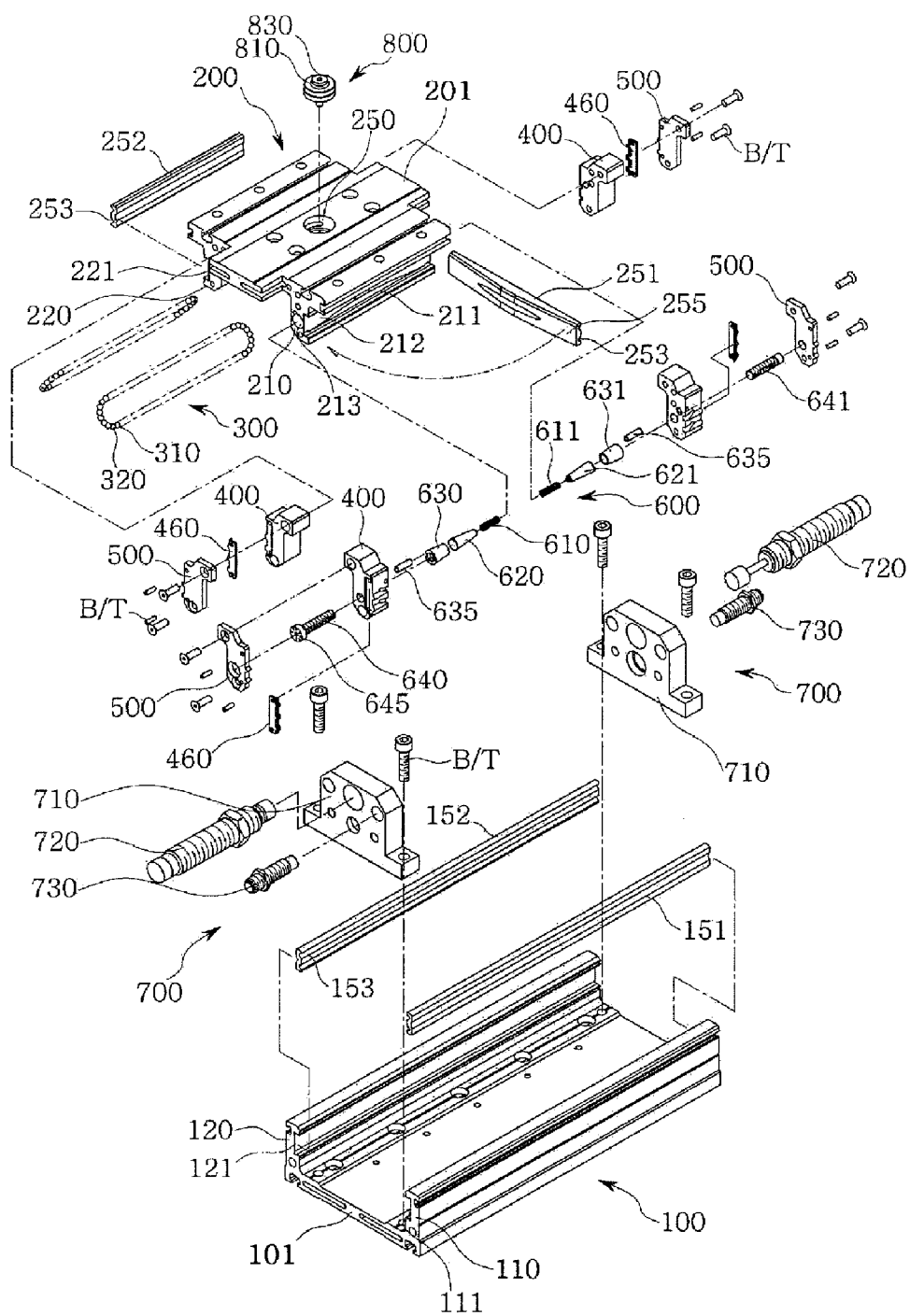
FIG. 2 is an exploded perspective view of the adjustable preload type linear guide system illustrated in FIG. 1.

Referring to FIGS. 1 and 2, the adjustable preload type linear guide system according to the current embodiment includes a base member 100, a slide member 200, and a preload adjustment unit 600.

Figure 3:
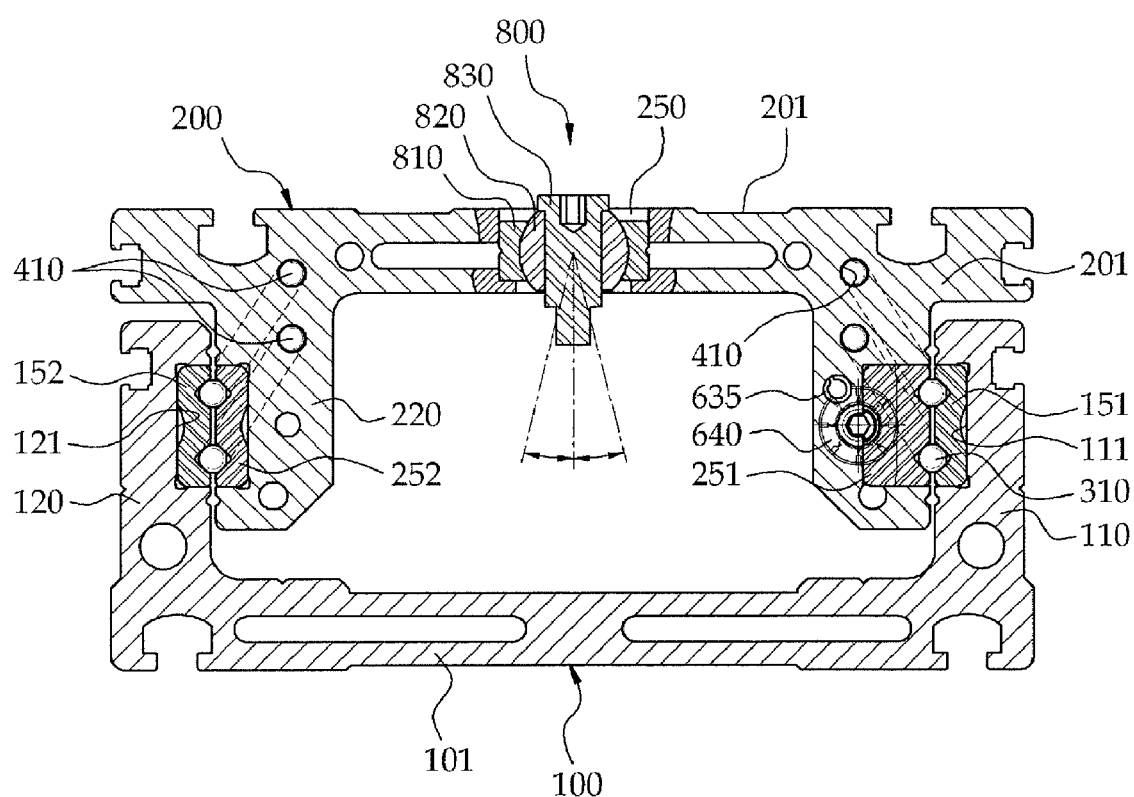
FIG. 3 is a side cross-sectional view of the adjustable preload type linear guide system illustrated in FIG. 1.
Figure 4:
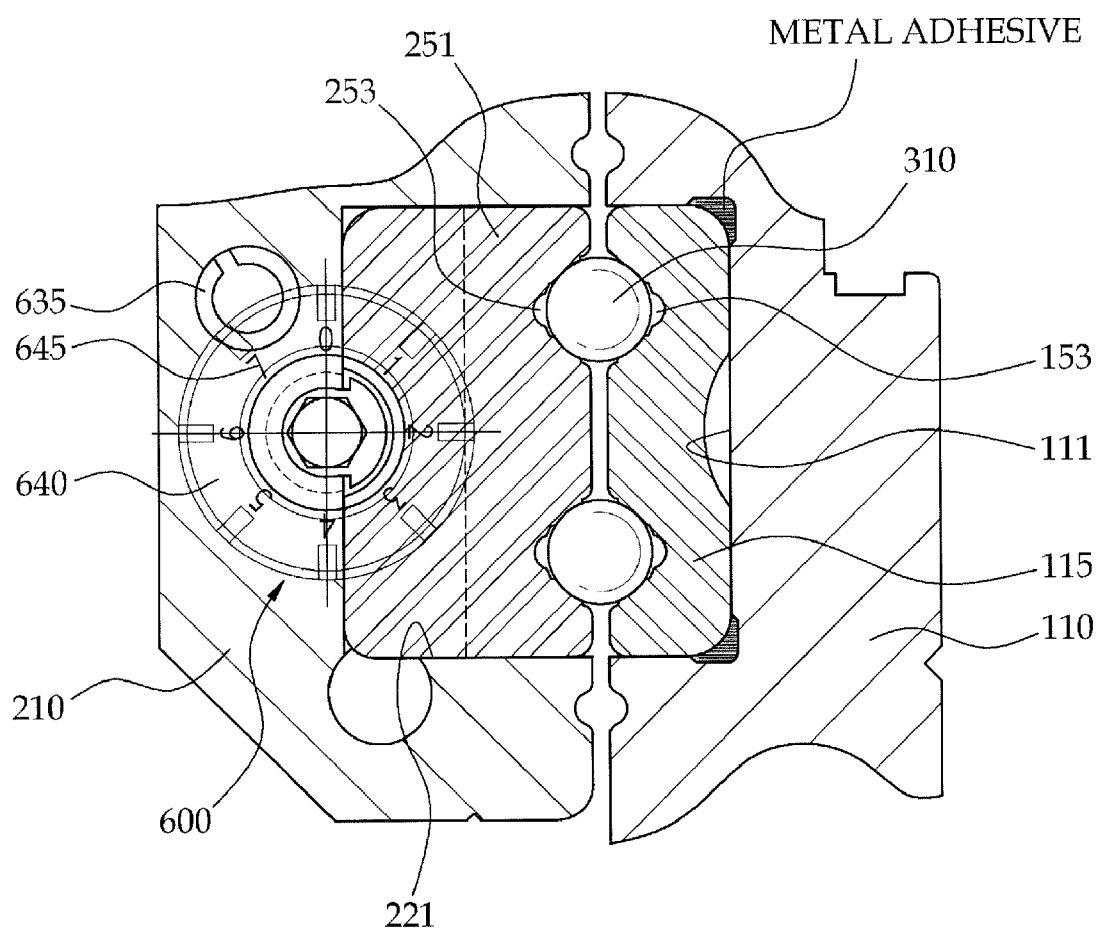
FIG. 4 is an enlarged view of a portion of FIG. 3.

Referring to FIGS. 3 and 4, the base member 100 includes a base body 101 and a pair of base rails 151 and 152 which are disposed on the base body 101. The base body 101 is formed of a light-weight aluminum profile that is formed by extrusion molding an aluminum material. Rail combination grooves 111 and 121 are formed in both sides of the base body 101 in a lengthwise direction of the base body 101, and the base rails 151 and 152 are inserted in the rail combination grooves 111 and 121 and thus are combined therewith. The base rails 151 and 152 are formed of an abrasion resistance material with higher rigidity than aluminum and are manufactured by cold rolling or drawing.

Figure 5:
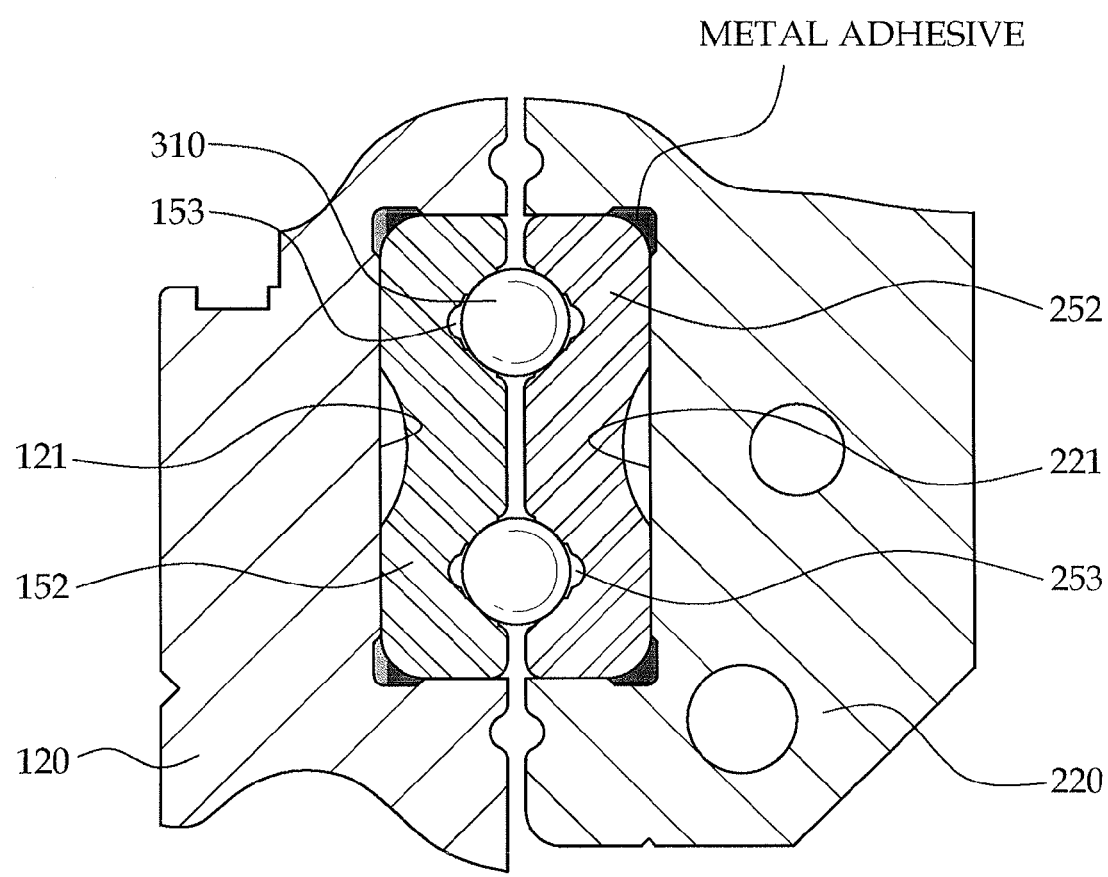
FIG. 5 is an enlarged view of another portion of FIG. 3.
Figure 6:
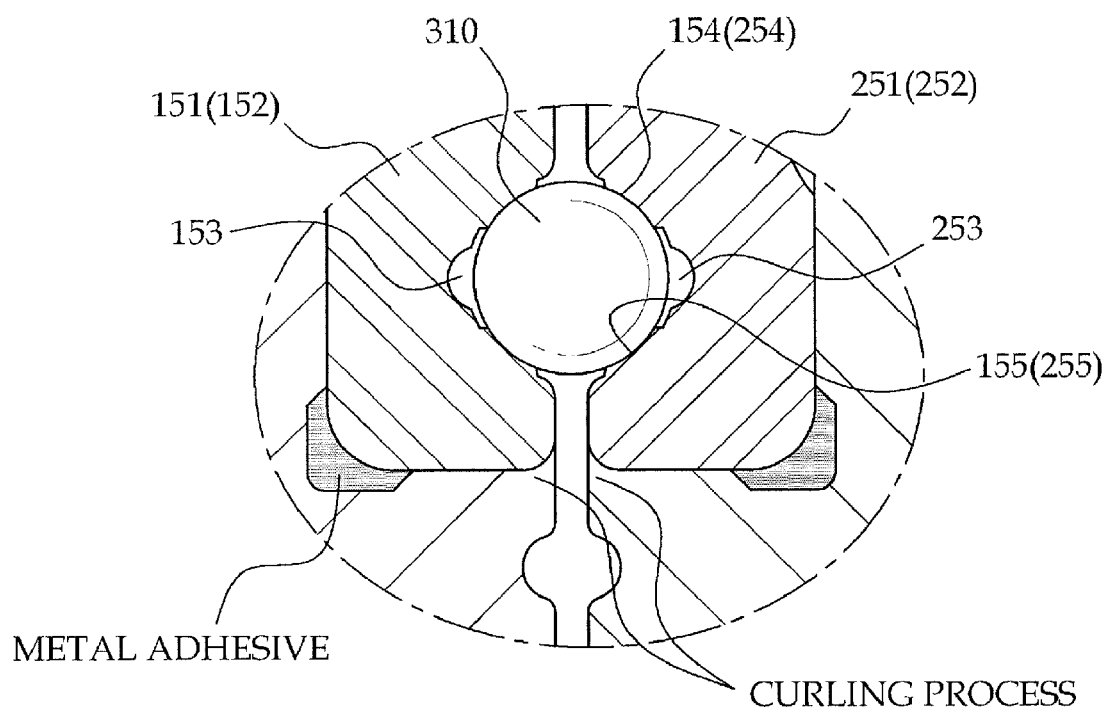
FIG. 6 is an enlarged view of a portion of FIG. 5.

Referring to FIGS. 5 and 6, after a metal adhesive is filled in the rail combination grooves 111 and 121 of the base body 101, the base rails 151 and 152 are inserted in the rail combination grooves 111 and 121 and thus are combined therewith.

Referring to FIGS. 3 and 4, the slide member 200 includes a slide body 201 and a pair of slide rails 251 and 252 which are disposed on the slide body 201. The slide body 201 is formed of a light-weight aluminum profile that is formed by extrusion molding an aluminum material. Rail combination grooves 211 and 221 are formed in both sides of the slide body 201 in a lengthwise direction of the slide body 201, and the slide rails 251 and 252 are inserted in the rail combination grooves 211 and 221 and thus are combined therewith. The slide rails 251 and 252 are formed of an abrasion resistance material with higher rigidity than aluminum and are manufactured by cold rolling or drawing.

Referring to FIGS. 5 and 6, after a metal adhesive is filled in the rail combination grooves 211 and 221 of the slide body 201, the slide rails 251 and 252 are inserted in the rail combination grooves 211 and 221 and thus are combined therewith.

The slide member 200 having the above structure is disposed between linear motion guide portions 110 and 120 of the base body 100. In this case, the pair of base rails 151 and 152 of the base member 100 and the pair of slide rails 251 and 252 of the slide member 200 are disposed to face each other. In this case, a ball bearing 300 including a plurality of balls is disposed between the base rails 151 and 152 and the slide rails 251 and 252 so that the slide rails 251 and 252 are smoothly slid relative to the base rails 151 and 152.

Referring to FIG. 3, an actuator accommodation space in which an actuator is to be disposed is formed in a middle portion of the adjustable preload type linear guide system in which the base body 101 of the base member 100 and the slide body 201 of the slide member 200 face each other.

Various types of devices, such as a linear motor, a ball screw, an air cylinder, a timing belt/pulley mechanism, and the like, may be used as the actuator. Since a proper actuator has only to be installed in the actuator accommodation space according to a usage purpose in this manner, the present invention has high compatibility.

Referring to FIGS. 2 through 4, two tracks 410 are formed on the slide body 201 to pass through the slide body 201 in a lengthwise direction of the slide body 201. Insertion grooves 153 and 253 that are formed in the base rails 151 and 152 and the slide rails 251 and 252 are connected to the tracks 410 and constitute a caterpillar that is a path of the ball bearing 300 including a plurality of balls.

As illustrated in FIG. 2, ball guide covers 400 are respectively combined with both ends of the slide body 201 in the lengthwise direction of the slide body 201. Two tracks 420 are formed on each of the ball guide covers 400 to connect the insertion grooves 153 and 253 and the tracks 410, thereby preventing escape of the ball bearing 300 and connecting caterpillar travel. Dust covers 500 are combined with outsides of the ball guide covers 400.

In this case, as illustrated in FIG. 3, a height of a central point of each track 410 of the slide member 200 is different from a height of a central point of each of the insertion grooves 153 and 253 that are formed in the base rails 151 and 152 and the slide rails 251 and 252, and each track 420 of the ball guide cover 400 that connects the insertion grooves 153 and 253 and the track 410, is inclined with respect to a bottom surface of the ball guide cover 400. When the track 420 of the ball guide cover 400 is inclined with respect to the bottom surface of the ball guide cover 400 in such a way that the height of each of the insertion grooves 153 and 253 and the height of the track 410 of the sliding member 200 are different from each other, a wide actuator accommodation space may be obtained, and a radius of gyration of the track 420 of the ball guide cover 400 may be increased. That is, the radius of gyration of the track 420 of the ball guide cover 400 may be increased so that a rolling motion of the ball bearing may be smoothly performed, and the size of the adjustable preload type linear guide system may be reduced.

Figure 7:
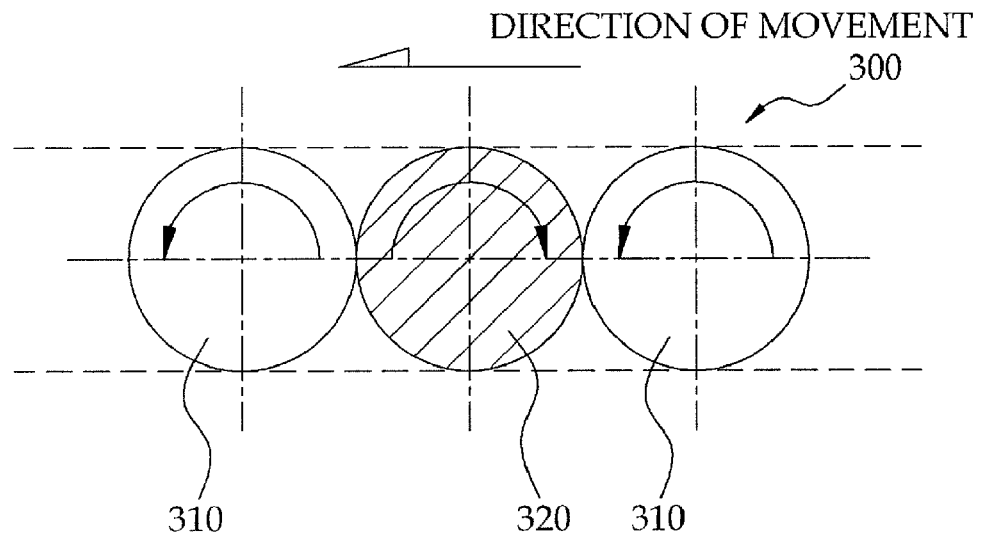
FIG. 7 illustrates a structure of a ball bearing illustrated in FIG. 7.
Figure 8:
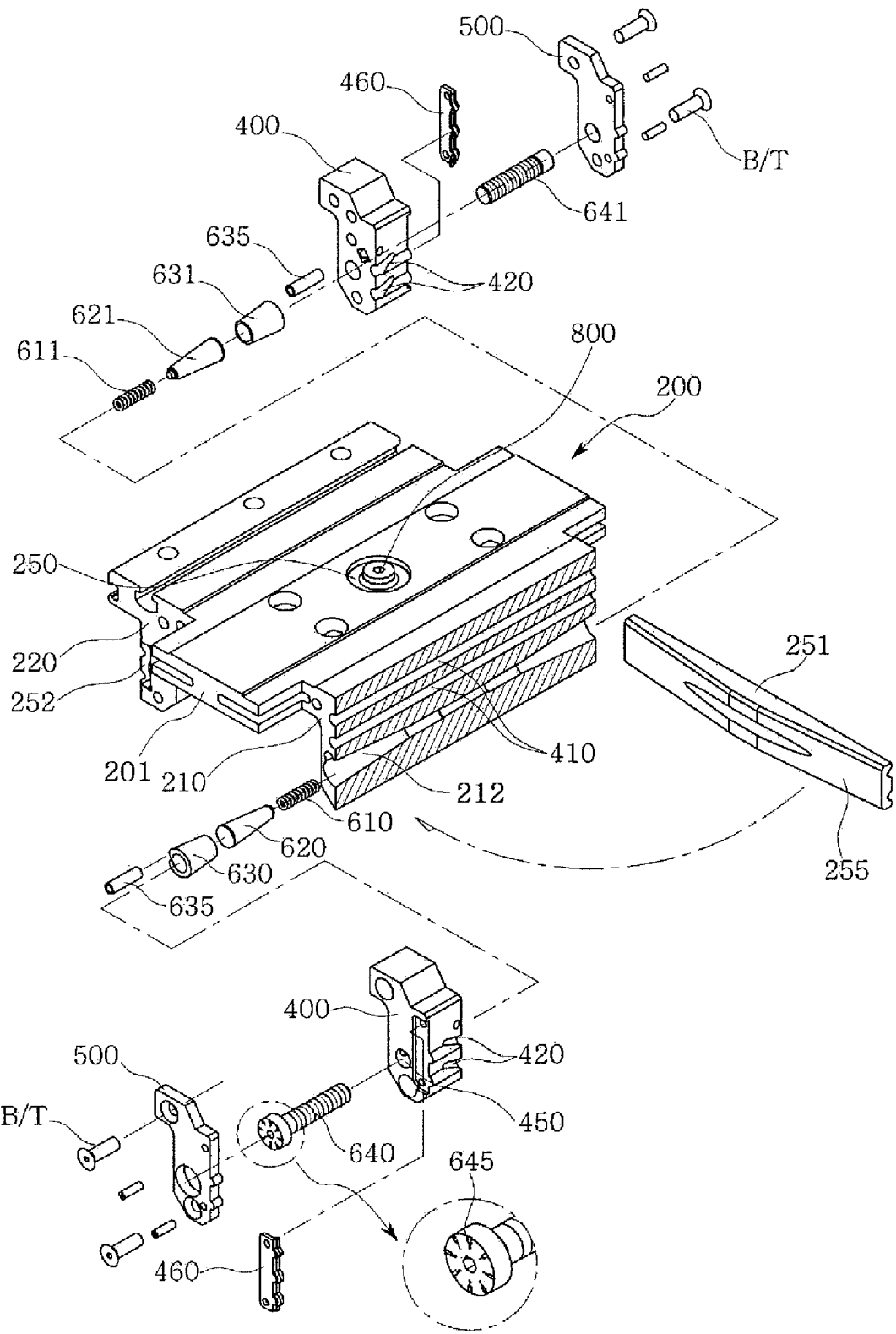
FIG. 8 is an exploded perspective view of a preload adjustment unit illustrated in FIG. 1.
Figure 9:
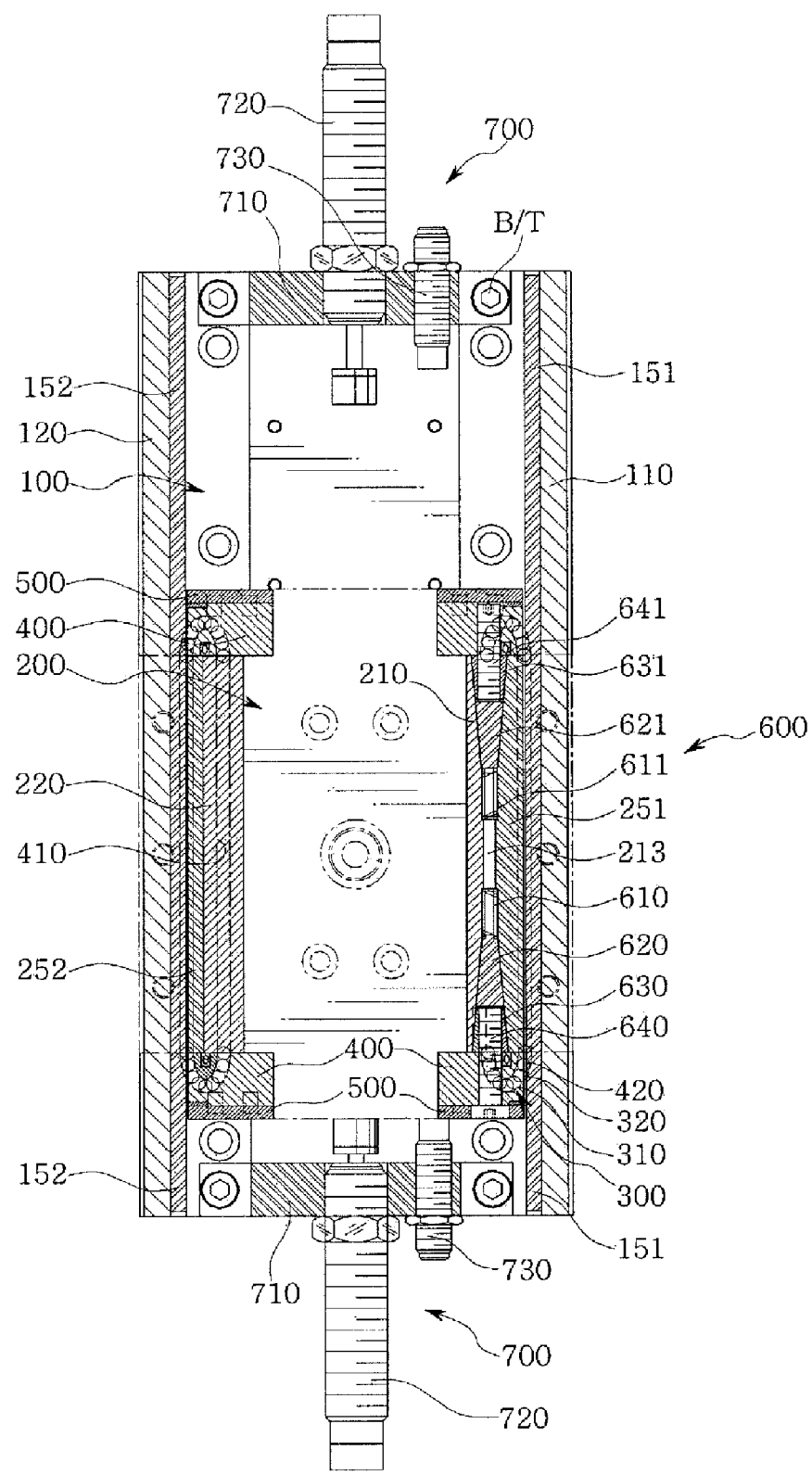
FIG. 9 is a planer cross-sectional view of the adjustable preload type linear guide system illustrated in FIG. 1.
Figure 10:
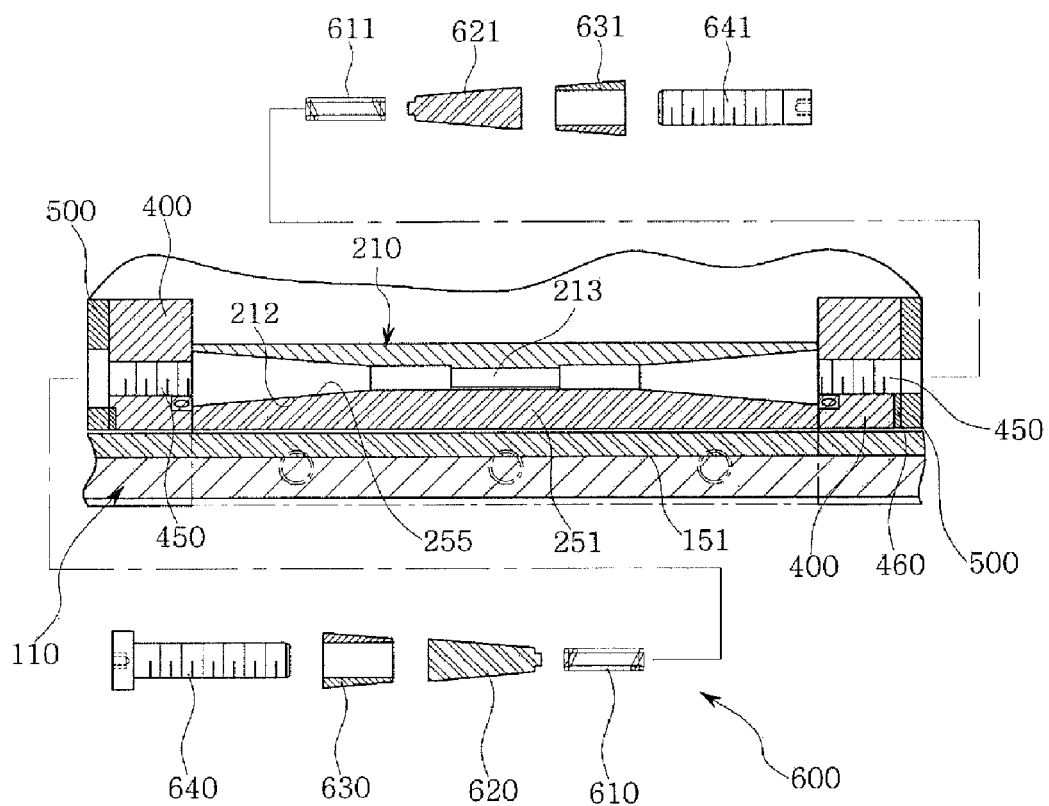
FIG. 10 is a cross-sectional view of the preload adjustment unit illustrated in FIG. 8.
Figure 11:
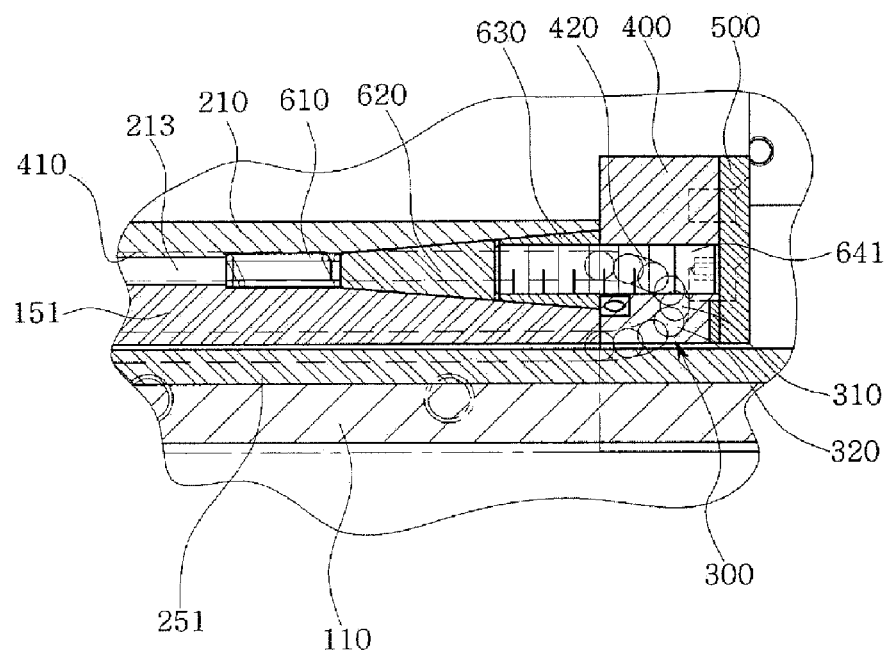
FIGS. 11 and 12 are enlarged views of portions of FIG. 10.

The plurality of balls of the ball bearing 300 include steel balls 310 that make a rolling motion by contacting directly the insertion grooves 153 and 253 of the base rails 151 and 152 and the slide rails 251 and 252, and resin balls 320 that have a smaller diameter than a diameter of the steel balls 310 and are formed of a synthetic resin material to have lubrication characteristics. As illustrated in FIG. 7, the steel balls 310 and the resin balls 320 are alternately disposed. The resin balls 320 are rotated in an opposite direction to a rotation direction of the steel balls 310 and minimize friction resistance that may be generated between the steel balls 310, thereby preventing occurrence of noise and vibration and providing smooth rolling motion. That is, the steel balls 310 contact directly the insertion grooves 153 and 253 and are loaded by the insertion grooves 153 and 253, and the resin balls 320 have a smaller diameter than the diameter of the steel balls 310 and thus are not loaded by the insertion grooves 153 and 253, thereby alleviating friction between the steel balls 310.

The preload adjustment unit 600 is installed between one 251 of the slide rails 251 and 252 and the slide body 202 and adjusts an interval and an angle of the slide rail 251 with respect to the slide body 202. In this way, the preload adjustment unit 600 adjusts a preload applied to the ball bearing 300 that is disposed between the base rails 151 and 152 and the slide rails 251 and 252.

Referring to FIGS. 8 through 12, the preload adjustment unit 600 includes conical wedges 620 and 621 and adjustment screws 640 and 641.

A stepped assembly hole 213 is formed in a boundary surface between the rail combination groove 211 formed in a linear motion guide portion 210 of the slide body 202 and the slide rail 251 on which the rail combination groove 211 and the slide rail 251 face each other. The stepped assembly hole 213 passes through the boundary surface in a lengthwise direction of the preload adjustment unit 600. Guide support facets 212 each having an inclined surface with an inner diameter increasing from the stepped assembly hole 213 to both ends of the stepped assembly hole 213 in the lengthwise direction of the preload adjustment unit 600 are formed at both sides of the rail combination groove 221. Inclination guide facets 255 each having the same inclination angle as that of the guide support facets 212 are formed on the slide rail 251 that faces the guide support facets 212.

Springs 610 and 611 are inserted in both ends of the stepped assembly hole 213, and the conical wedges 620 and 621 are inserted in outer portions of the springs 610 and 611. The conical wedges 620 and 621 are tapered and are disposed between the guide support facets 212 and the inclination guide facets 255 in the lengthwise direction of the preload adjustment unit 600. Support inserts 630 and 631 are inserted in outer portions of the conical wedges 620 and 621, and a fixing pin 635 that prevents rotation of the support inserts 630 and 631 is combined with the support inserts 630 and 631. The adjustment screws 640 and 641 are screw coupled to a screw hole 450 that is formed in the ball guide cover 400 and pass through the support inserts 630 and 631, thereby adjusting advancement/retreat movement of the conical wedge 620.

Figure 12:
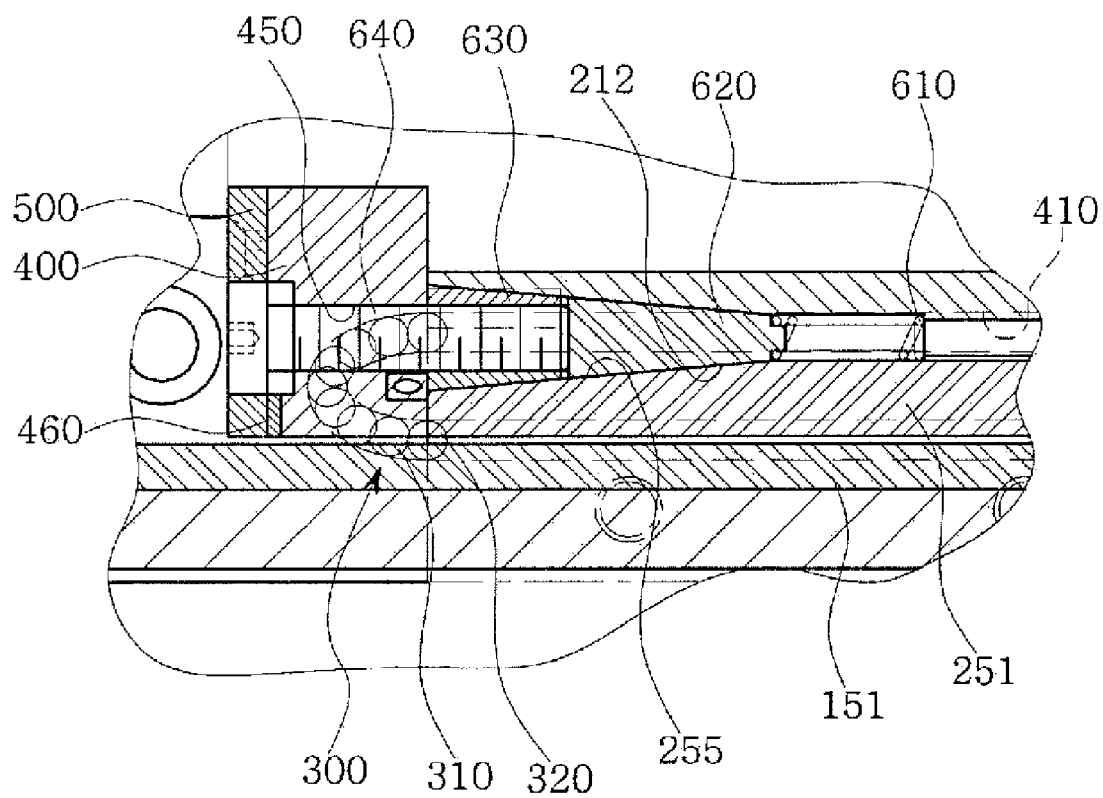

When the preload adjustment unit 600 allows the conical wedge 620 to move forward due to screw rotation of the adjustment screw 640, as illustrated in FIG. 12, the conical wedge 620 pressurizes the inclination guide facet 255 and moves forward towards the inclination guide facet 255 of the slide rail 251 and thus pushes the slide rail 215 to the outside.

As a result, intervals between the base rails 151 and 152 and the slide rails 251 and 252 are decreased so that a preload applied to the steel balls 310 of the ball bearing 300 may be easily adjusted. In the same way, angles of the slide rails 251 and 252 with respect to the base rails 151 and 152 may be adjusted.

A preload amount indication gradation 645 is marked on a front side of the adjustment screw 640 to check and adjust the amount of preload by using screw rotation of the adjustment screw 640.

The base rails 151 and 152 of the base member 100 and the slide rail 252 of the slide member 200 are securely combined with each other by performing a curling is process when a metal adhesive is filled in each of the rail combination grooves 111 and 121 and 211 and 221 and the base rails 151 and 152 of the base member 100 and the slide rail 252 of the slide member 200 are adhered to each other.

In this case, it is obvious that the slide rail 251 which is combined with the rail combination groove 211 of the slide member 200 and of which movement is adjusted by the preload adjustment unit 600 does not include an adhesion combination structure constituted by using a metal adhesive.

In addition, the insertion grooves 153 and 253 that are formed in each of the base rails 151 and 152 and the slide rails 251 and 252, are configured in such a way that protruding friction support portions 154 and 254 are formed in the insertion grooves 153 and 253 and processed support facets 155 and 255 corresponding to curved surfaces of the steel balls 310 of the ball bearing 300 are formed on the protruding friction support portions 154 and 254 along the lengthwise direction of the preload adjustment unit 600 so that a friction force between the steel balls 310 may be minimized.

In addition, a stopper unit 700 that limits a linear motion distance when the slide member 200 moves linearly may be disposed on both ends of the base member 100 in the lengthwise direction of the base member 100.

The stopper unit 700 includes a support plate 710 that is bolt coupled on front and rear ends of a middle portion of the base member 100, and a shock absorber 720 and a stopper bolt 730 that are screw coupled to the support plate 710.

The stopper unit 700 is stopped by a damper that is combined with a front end of the stopper bolt 730 when the slide member 200 is shock-absorbed by the shock absorber 720. The linear motion distance of the slide member 200 is limited according to forward and backward movement of the stopper bolt 730.

Figure 13:
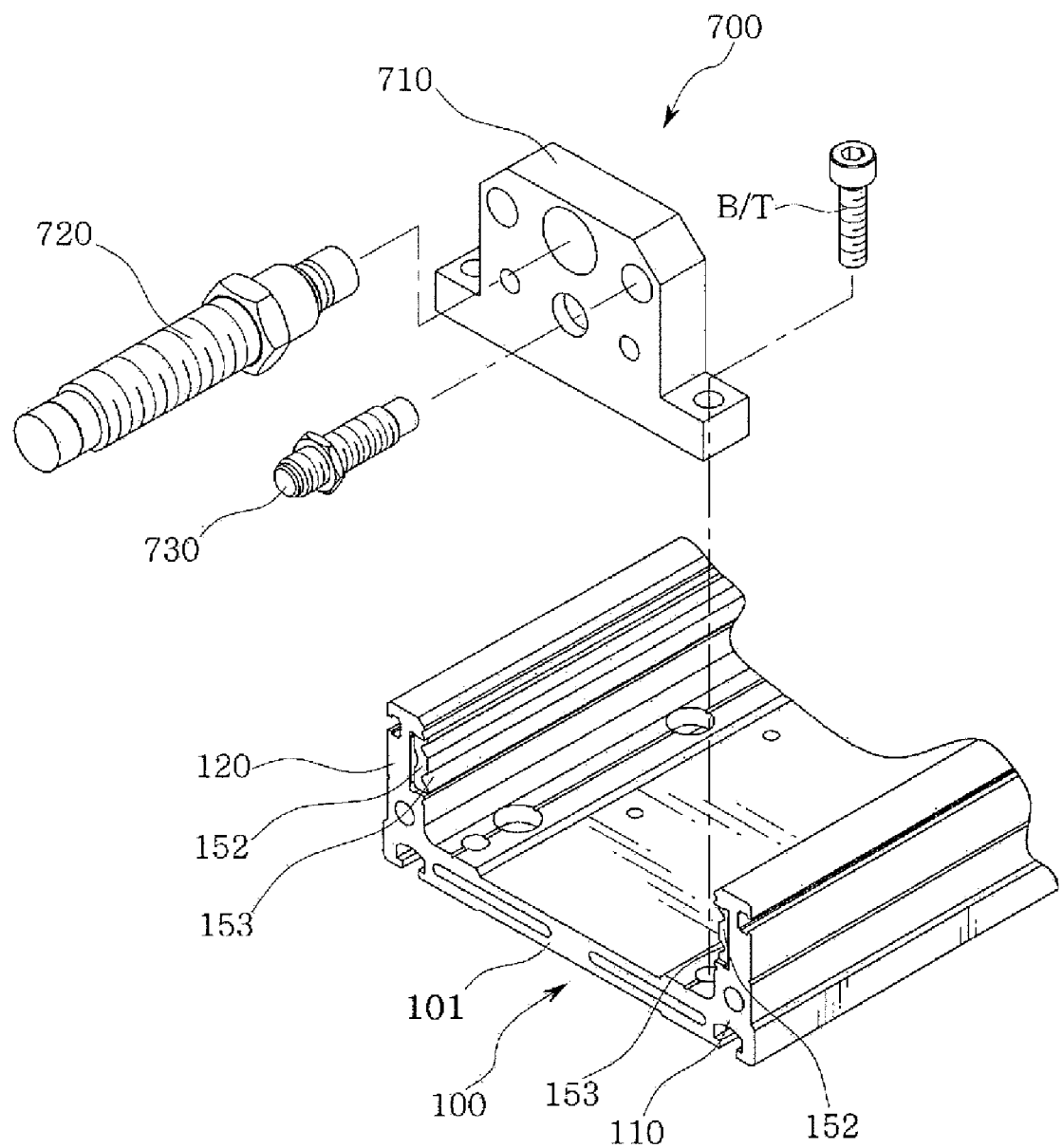
FIG. 13 is an enlarged view of a portion of FIG. 2.
Figure 14:
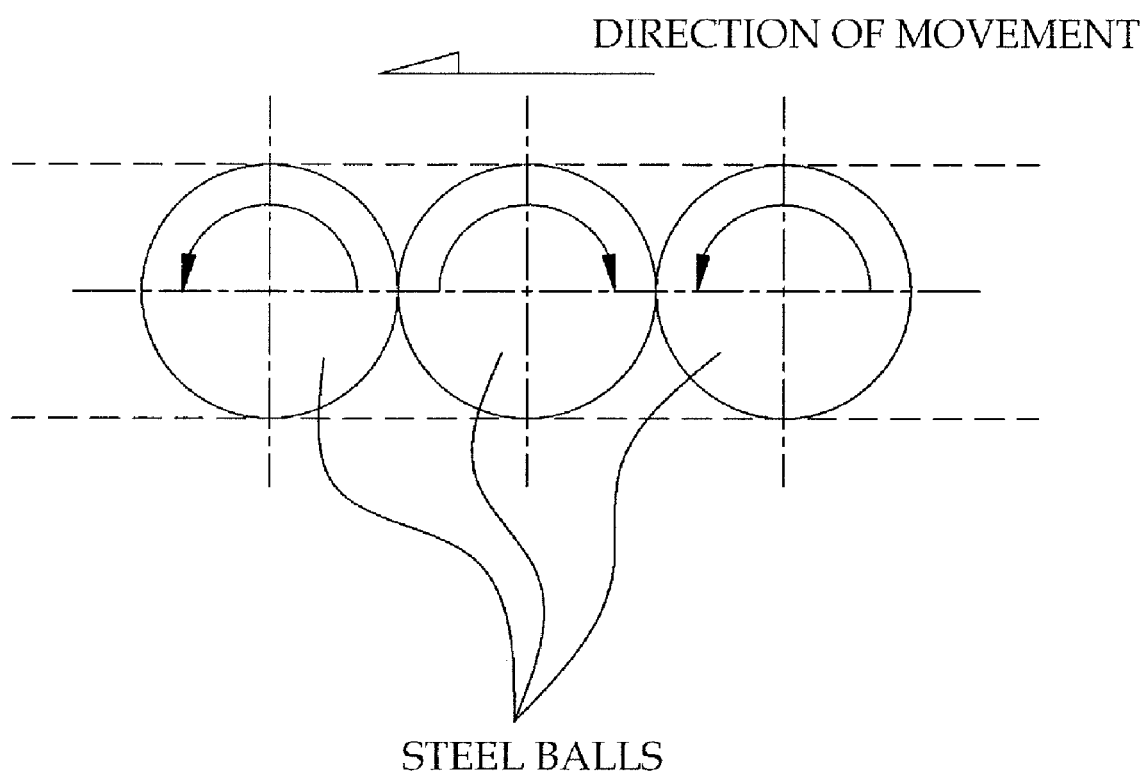
FIG. 14 illustrates a structure of a general ball bearing.

Referring to FIG. 13, an axial hole in which a ball screw is to be fixed may be formed in the support plate 710 and may be used to fix the ball screw.

Referring to FIG. 3, a coupling 800 is disposed in a central combination hole 250 of the slide member 200 so as to conveniently combine a linear motion actuator.

The coupling 800 includes a base 810 that is combined with the central combination hole 250, a ball nut 820 that is rotatably combined with the base 810, and a clamping bolt 830 that is screw coupled to the ball nut 820 and then is screw coupled to the actuator.

Since the ball nut 820 is combined with the base 810 to be rotated around the base 810, even when a linear motion trajectory of the actuator and a linear motion trajectory of the slide member 200 do not coincide with each other slightly, twist of the actuator may be corrected when the ball nut 820 is rotated around the base 810.

Reference numeral B/T represents a bolt for engagement and assembling of individual elements, and reference numeral 460 represents a support cover that is screw coupled to the ball guide cover 400 and prevents escape of the balls of the ball bearing 300.

Hereinafter, an operation of the adjustable preload type linear guide system having the above structure will be described.

First, in the adjustable preload type linear guide system illustrated in FIG. 1, the base body 101 excluding the base rails 151 and 152 and the slide body 201 excluding the slide rails 251 and 252 are formed of aluminum materials so that the light-weight of the adjustable preload type linear guide system may be maximized. Thus, linear motion of the adjustable preload type linear guide system illustrated in FIG. 1 is performed at high speed so that productivity of the adjustable preload type linear guide system may be improved.

In addition, the track 420 of the ball guide cover 400 is inclined, as illustrated in FIG. 3, so that a wide actuator accommodation space may be obtained. As a result, the size of the adjustable preload type linear guide system is reduced, and the adjustable preload type linear guide system is made slim so that a weight thereof may be reduced and production cost thereof may be reduced.

In addition, since a variety of types of actuators are disposed in the actuator accommodation space between the slide member 200 and the base member 100, the actuator may be commonly used according to various usages and user's purposes. Since compatibility with other actuators is obtained, an exclusive linear guide system that is suitable for each equipment does not need to be designed and manufactured every time but a linear guide system is commonly designed and manufactured so that manufacturing cost of the linear guide system may be remarkably reduced.

In addition, the ball bearing 300 includes a plurality of steel balls 310 and a plurality of resin balls 320 so that occurrence of noise and vibration may be reduced and smooth linear motion of the slide member 200 with respect to the base ember 100 may be performed.

Furthermore, the plurality of steel balls 310 of the ball bearing 300 are supported by the processed support facets 155 and 255 that protrude from the insertion grooves 153 and 253 along a lengthwise direction of the preload adjustment unit 600 so that a friction force between the steel balls 310 of the ball bearing 300 may be minimized and slide motion of the slide member 200 may be more smoothly performed.

In the adjustable preload type linear guide system illustrated in FIG. 1, although the ball bearing 300 is worn out when it is being used, a preload of the ball bearing 300 is adjusted by the preload adjustment unit 600 so that the life span of the adjustable preload type linear guide system of FIG. 1 may be lengthened. Thus, an operation of replacing the steel balls 310 of the ball bearing 300 that is worn out during its usage, like in a general linear guide system, does not need to be performed.

Adjusting of the preload of the ball bearing 300 causes adjustment of a rolling motion force in which the slide member 200 is moved relative to the base member 100 so that linear motion of the slide member 200 may be precisely controlled.

The invention claimed is:

1. An adjustable preload type linear guide system includes:
    a base member having a base body, and a pair of base rails which are disposed in parallel to each other on the base body;
    a slide member having a slide body, and a pair of slide rails which are disposed on the slide body to face the pair of base rails, wherein the slide rails slide relative to the base rails by a ball bearing which is installed between the base rails and the slide rails, thereby enabling the slide member to slide relative to the base member; and
    a preload adjustment unit which is installed between one of the slide rails and the slide body for adjusting the intervals and angles of the slide rails with respect to the slide body, thereby adjusting the preload of the ball bearing which is disposed between the base rails and the slide rails,
    wherein the preload adjustment unit comprises conical wedges that are tapered and are disposed between the slide body and the slide rails in a lengthwise direction of the preload adjustment unit and adjustment screws that adjust advancement/retreat movement of the conical wedges in the lengthwise direction of the preload adjustment unit, and the preload adjustment unit adjusts intervals and angles of the slide rails with respect to the slide body based on the advancement/retreat movement of the conical wedges.

2. The adjustable preload type linear guide system of claim 1, wherein two preload adjustment units are disposed on both ends of the slide body and the slide rails in the lengthwise direction of the preload adjustment units to face each other.

3. The adjustable preload type linear guide system of claim 1, wherein the base body comprises an aluminum material and rail combination grooves formed in both sides of the base body, and the base rails comprise an abrasion resistance material with higher rigidity than aluminum and are inserted in the rail combination grooves of the base body and thus are combined with the rail combination grooves, and the slide body comprises an aluminum material and rail combination grooves formed in both sides of the slide body, and the slide rails comprise an abrasion resistance material with higher rigidity than aluminum and are inserted in the rail combination grooves of the slide body and thus are combined with the rail combination grooves.

4. The adjustable preload type linear guide system of claim 3, wherein the base rails are combined with the rail combination grooves after a metal adhesive is filled in the rail combination grooves of the base member.

5. The adjustable preload type linear guide system of claim 1, wherein the ball bearing comprises a plurality of steel balls that contact directly the base rails and the slide rails and makes a rolling motion, and a plurality of resin balls that have a smaller diameter than a diameter of the steel balls and comprise a synthetic resin material to have lubrication characteristics.

6. The adjustable preload type linear guide system of claim 5, wherein the plurality of steel balls and the plurality of resin balls are alternately disposed.

7. The adjustable preload type linear guide system of claim 1, further comprising a coupling that is installed on the slide member and allows an actuator for moving the slide member relative to the base member and the slide member to be easily combined with each other, wherein the coupling comprises a base that is combined with the slide member and a ball nut that is rotatably combined with the base.

8. An adjustable preload type linear guide system includes:
    a base member having a base body, and a pair of base rails which are disposed in parallel to each other on the base body;
    a slide member having a slide body, and a pair of slide rails which are disposed on the slide body to face the pair of base rails, wherein the slide rails slide relative to the base rails by a ball bearing which is installed between the base rails and the slide rails, thereby enabling the slide member to slide relative to the base member; and
    a preload adjustment unit which is installed between one of the slide rails and the slide body for adjusting the intervals and angles of the slide rails with respect to the slide body, thereby adjusting the preload of the ball bearing which is disposed between the base rails and the slide rails,
    wherein the ball bearing comprises a plurality of steel balls that contact directly the base rails and the slide rails and makes a rolling motion, and a plurality of resin balls that have a smaller diameter than a diameter of the steel balls and comprise a synthetic resin material to have lubrication characteristics, and
    wherein insertion grooves in which the steel balls are disposed, are formed in each of the base rails and the slide rails, and protruding friction support portions are formed in the insertion grooves, and processed support facets corresponding to curved surfaces of the steel balls are formed on the protruding friction support portions.

* * * * *